United States Patent [19]

Asami et al.

[11] Patent Number: 5,568,675
[45] Date of Patent: Oct. 29, 1996

[54] TWO-PIECE CLIP

[75] Inventors: Goro Asami; Tsuyoshi Kato; Hideo Konishi, all of Utsunomiya, Japan

[73] Assignee: Nifco Inc., Yokohama, Japan

[21] Appl. No.: 388,440

[22] Filed: Feb. 14, 1995

[30] Foreign Application Priority Data

Mar. 29, 1994 [JP] Japan ................................ 6-094051

[51] Int. Cl.⁶ ........................................................ F16B 13/04
[52] U.S. Cl. ........................... 24/453; 24/297; 24/607; 411/41; 411/44
[58] Field of Search ............................. 24/606, 607, 297, 24/453; 411/41, 45, 57, 44

[56] References Cited

U.S. PATENT DOCUMENTS

| | | | |
|---|---|---|---|
| 3,918,130 | 11/1975 | Poe | 24/297 X |
| 4,114,509 | 9/1978 | Poe | 24/607 X |
| 4,375,342 | 3/1983 | Wollar et al. | 411/41 |
| 4,405,272 | 9/1983 | Wollar | 411/41 |
| 4,970,761 | 11/1990 | Nakamura | 24/607 |
| 5,085,545 | 2/1992 | Takahashi | 411/45 |
| 5,163,795 | 11/1992 | Benoit et al. | 411/41 X |
| 5,375,954 | 12/1994 | Eguchi | 411/41 X |

FOREIGN PATENT DOCUMENTS

| | | |
|---|---|---|
| 57-4244 | 1/1982 | Japan . |
| 1-43532 | 12/1989 | Japan . |
| 371927 | 10/1963 | Switzerland ............................. 24/297 |

Primary Examiner—James R. Brittain
Attorney, Agent, or Firm—Oblon, Spivak, McClelland, Maier & Neustadt, P.C.

[57] ABSTRACT

A clip includes a female member having a cylindrical body having a hole with an expanded engaging portion around an inner surface at an upper end opening of the hole, spreadable legs formed by dividing a lower end portion of the body, and a flange extending outward from a peripheral surface at an upper end portion of the body, and a male member that is inserted into the female member, the male member comprising a head portion, a shaft vertically descending from an underside of the head portion, and an engaging recess formed around a periphery of a lower end of the shaft that can receive the expanded engaging portion of the female member to maintain the male and female members in a provisionally assembled state.

7 Claims, 4 Drawing Sheets

TWO-PIECE CLIP

BACKGROUND OF THE INVENTION

1. Field of the Invention

The present invention relates to a clip of synthetic resin used to fasten plates together or to attach parts to a plate, for example.

2. Description of the Prior Art

Many clips formed of synthetic resin have been proposed, and there are many examples of such clips in practical use. The present invention relates to an improved clip consisting of an assemblage of two members, one male and one female.

When clips comprised of male and female members are used, to attach plates together, for example, first the female member is inserted into a hole in the plates, and this is followed by the insertion of the male member. More specifically, a shaft portion of the male member that acts as a wedge is forced into a hole formed in the female member. When the end of the shaft clears the plates, the end of the shaft is made to expand so that the plates are held together between the expanded end and the other end. The male and female members are usually manufactured as separate parts. However, manufacturing the male and female members separately is inconvenient from the standpoint of product management as well as from the standpoint of handling. Usually, therefore, the clips are assembled to form a single product item by inserting the male shaft into the female hole.

This is a provisional assembly in which the shaft is inserted and maintained at a depth that does not cause the expansion of the female member. The male member thus provisionally engaged in the female member is the part that is usually gripped to insert the clip into the holes in the plates. In the case of a car assembly line, for example, being able to grip the male member for this purpose is an important factor in raising working efficiency.

In the case of conventional clips, however, no consideration is given to the fact that the male member is gripped for this purpose. Instead, the emphasis is merely on locking the male and female members together. This lack of consideration is also related to constraints imposed by the location of the clip. That is, when the clip is being used to attach parts to a car body, there is little space to hold the clip. In particular, when there is not enough space in the thickness direction of plates to allow the insertion of a long shaft, it is often necessary to reduce the overall length of the clips. Doing this can result in the male shaft not being long enough to use as a grip when provisionally inserted in the female member.

Japanese Utility Model Disclosures 57-4244 and 1-43532 each disclose this type of conventional clip comprised by assembling male and female members. However, in both cases the disclosures only extend to the provisional assembly of the two members, and do not touch on maintaining a sufficient male member length to enable it to be readily grasped when the clip is in the provisionally assembled state.

SUMMARY OF THE INVENTION

The principal object of the present invention is to provide a clip comprised of an assembly of male and female members in which when the male and female members are provisionally assembled, the male member projects by an amount that makes it easy to hold, thereby facilitating moving the clip to a prescribed location for use in attaching a part or the like.

Another object of the invention is to provide a clip in which the male and female members can readily and stably be provisionally assembled, and if required can be readily separated without damaging them.

A further object of the invention is to provide a clip that when used to attach plates or the like together, starting with the male member provisionally inserted in the female member, produces a tactile snap when the male member is pushed into the female member, providing tactile confirmation that the male member has locked into full engagement with the female member.

In accordance with the present invention, the above object is attained by a clip comprising a female member comprising a cylindrical body having a hole with an expanded engaging portion around an inner surface at an upper end opening of the hole; spreadable legs formed by dividing a lower end portion of the body; and a flange extending outward from a peripheral surface at an upper end portion of the body; and a male member for insertion in the female member, said male member comprising a head portion; a shaft vertically descending from an underside of the head portion; and an engaging recess formed around a periphery of a lower end of the shaft that can receive the expanded engaging portion of the female member to maintain the male and female members in a provisionally assembled state.

The object is also attained by a clip in which the expanded engaging portion is an annular protrusion formed around an inner surface at an upper end opening of the hole in the female member, and the engaging recess of the male member is an annular groove formed around the outer peripheral surface of the lower end of the shaft, thereby providing provisional engagement around the entire periphery without having to specify the peripheral orientation between the male and female members.

The object is also attained by a clip in which the expanded engaging portion is cylindrical in shape and slopes inwardly up from the inner surface of the opening at the upper end of the hole, and the cylinder is vertically slit into a plurality of sections to reduce the insertion force for provisional assembly, and to impart elasticity to stabilize the state of provisional assembly.

The object is also attained by a clip in which the legs of the female member taper down toward the lower end portion and are provided with a small projecting portion where the diameter is at its smallest, thereby also permitting the male member shaft to be disengaged from the female member.

The object is also attained by a clip in which the male member shaft is further provided with an annular groove formed around the peripheral surface of the upper end portion of the shaft that engages with the expanded engaging portion around the inner surface at the upper end opening of the hole of the female member when the engaging recess around the peripheral surface at the lower end of the shaft engages with the small projecting portion. This engagement at two points stabilizes the assembly of the male and female members.

Further features of the invention, its nature and various advantages will be more apparent from the accompanying drawings and following detailed description of the invention.

DESCRIPTION OF THE PREFERRED EMBODIMENT

Figure 1:
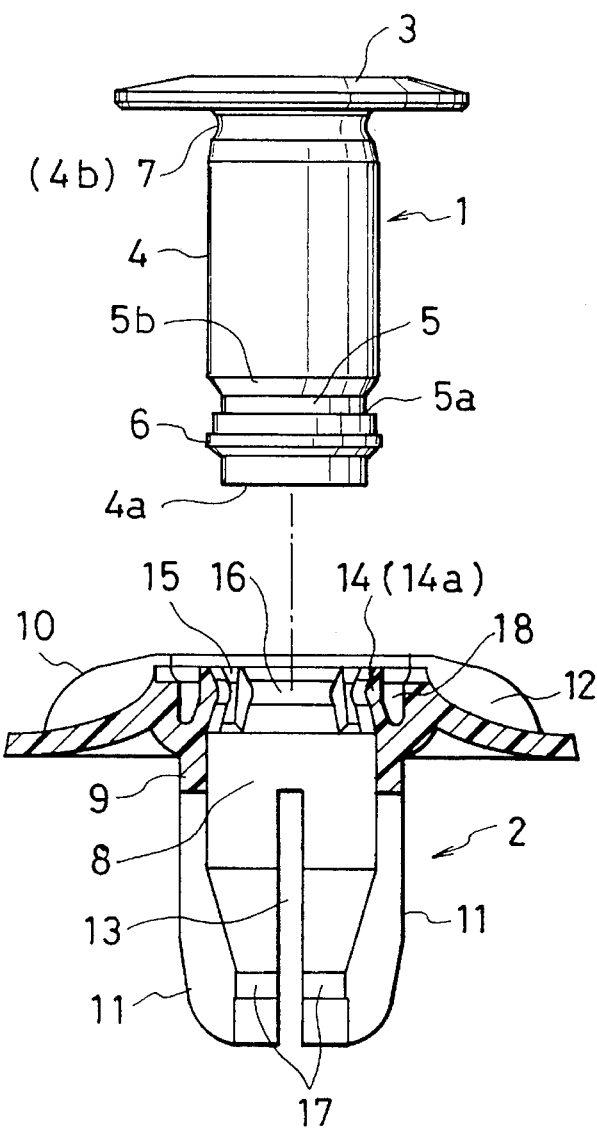
FIG. 1 is a front view of the clip of this invention showing the male and female members in a non-assembled state, with the female member shown in cross-section.

The drawings illustrate an embodiment of the clip of the present invention comprised of a male member 1 and a female member 2 each formed of thermoplastic resin. In this embodiment the male member 1 is formed of polypropylene and the female member 2 of polyacetal. When the clip is used for fastening purposes that requires the forcible deformation of pans of the female member, as described below, a material is selected for the female member that provides a suitable degree of both stiffness and flexibility.

The male member 1 has a thin, disk-shaped head 3 and a cylindrical shaft 4 extending vertically downward from the central portion of the underside of the head 3. An engaging groove 5 is provided around the periphery of the lower end 4a of the shaft 4. The lower edge 5a of the groove 5 is a clearly defined step cut in toward the bottom of the groove at right-angles to the peripheral surface. The upper edge 5b is tapered. A slight, annular protrusion 6 is provided between the groove 5 and the lower end 4a. An engaging groove 7 with a curved bottom is formed around the peripheral surface of the upper end portion 4b of the shaft 4.

The female member 2 is comprised of a body 9 axially provided with a hole 8 large enough to receive the shaft 4 of the male member 1; a flange 10 that extends outward from the peripheral surface at the upper end of the shaft; and legs 11 that extend from the lower end of the body 9. The flange 10 is shaped like an umbrella, sloping down from the top-end peripheral surface of the body 9. In this embodiment the flange 10 has two cutaway portions 12. These cutaway portions 12 form spaces between the head 3 and the upper surface of the flange when the male member 1 and female member 2 are assembled together.

The legs 11 are formed as substantially integral parts of the body 9 by four slits extending up from the lower end of the body 9 to form four legs. While retaining their cylindrical form, the legs 11 taper towards the end to facilitate insertion. The hole 8 is provided with a diameter that enables it to receive the shaft 4 of the male member 1. The diameter of the hole 8 is gradually reduced, starting from the portion where the legs 11 start, while the end of each leg 11 has an increased thickness. An expanded engaging portion 14 is provided around the inner surface of the opening at the upper end, forming a constricted opening for the provisional engagement of the male member shaft 4.

The expanded engaging portion 14 is cylindrical in shape and slopes inwardly up from the inner surface of the opening at the upper end of the hole 8, forming a second opening portion. The engaging portion 14 is formed of thin material to impart elasticity. The upper end is divided into a plurality of sections (four, in this embodiment) by equidistantly provided slits 15, forming four resilient members 14a. The inner surface of the expanded engaging portion 14 is provided with a projecting portion 16 having an inside diameter that is smaller than the diameter of the shaft 4, so that when the shaft 4 is inserted into the hole 8 the engaging portion 14 is expanded, and when the groove 5 is reached the projecting portion 16 automatically fits into the groove 5.

An annular small projecting portion 17 is formed on the tapered reduced diameter portion at the end of the hole 8 for engagement with the protrusion 6 on the shaft 4. The engagement between the small projecting portion 17 and the protrusion 6 prevents the shaft 4 slipping out. The snap of the engagement taking place also serves to provide tactile confirmation that engagement has been accomplished. For this, the leading edge of the small projecting portion 17 and the protrusion 6 are formed at an acute angle so that the stepped portion of each engages with a snap.

In the clip thus configured, to assemble the separately formed male and female members the male member shaft 4 is inserted into the female member hole 8. Doing this causes the tip of the shaft to expand the engaging portion 14 and the projecting portion 16 on the inside of each of the resilient members 14a is received into the groove 5, thereby providing provisional engagement. Confirmation that provisional engagement has taken place is signified by the snap produced as the projecting portions 16 pass over the protrusion 6, and by a further click as they pass over the edge 5a and snap into place in the groove 5.

Figure 2:
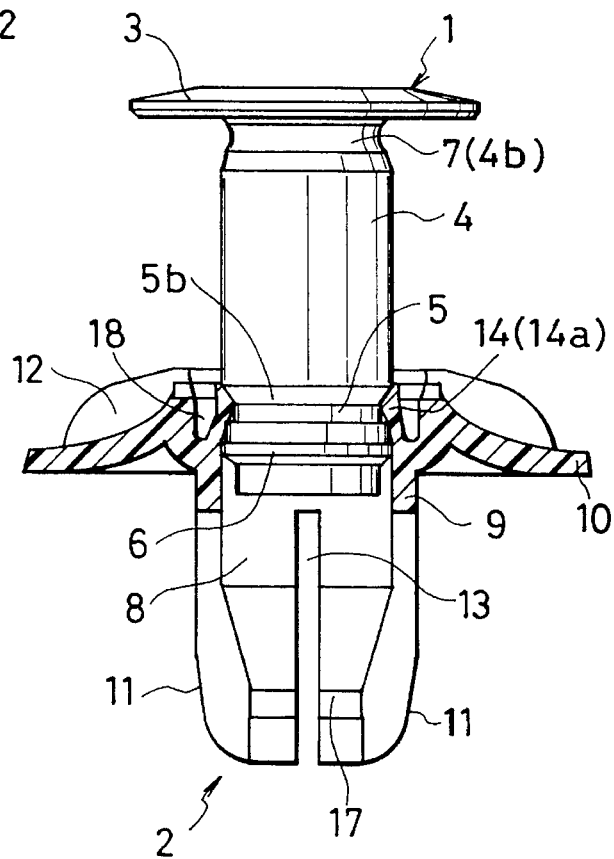
FIG. 2 is a front view of the clip of FIG. 1 showing the male and female members in a provisionally assembled state, with the female member shown in cross-section.
Figure 3:
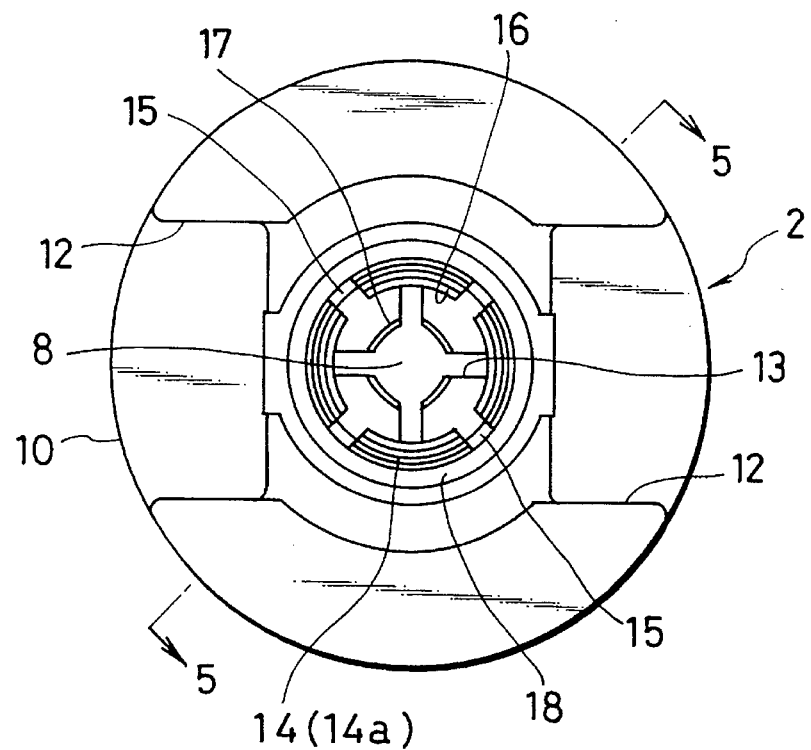
FIG. 3 is a plan view of the female member of the clip of FIG. 1.
Figure 4:
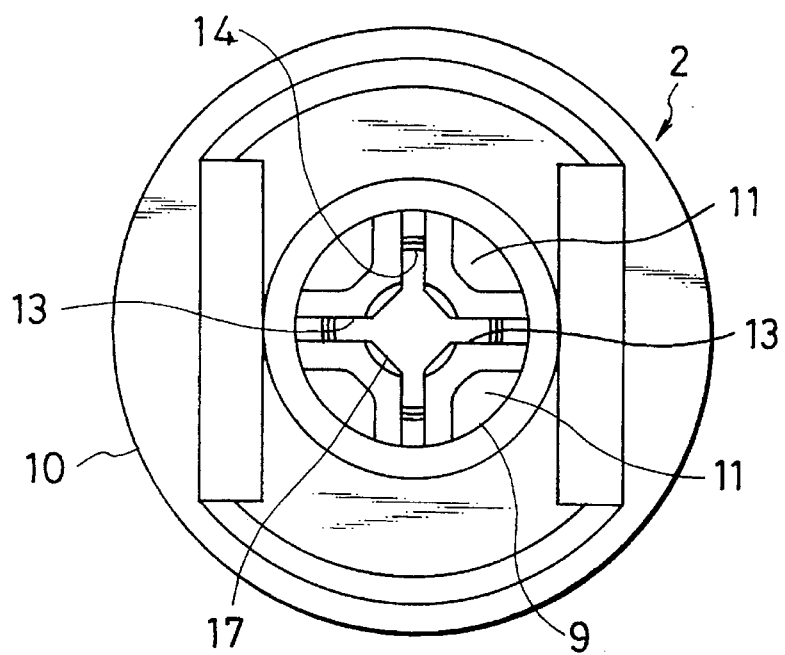
FIG. 4 is a bottom view of the female member of the clip of FIG. 1.
Figure 5:
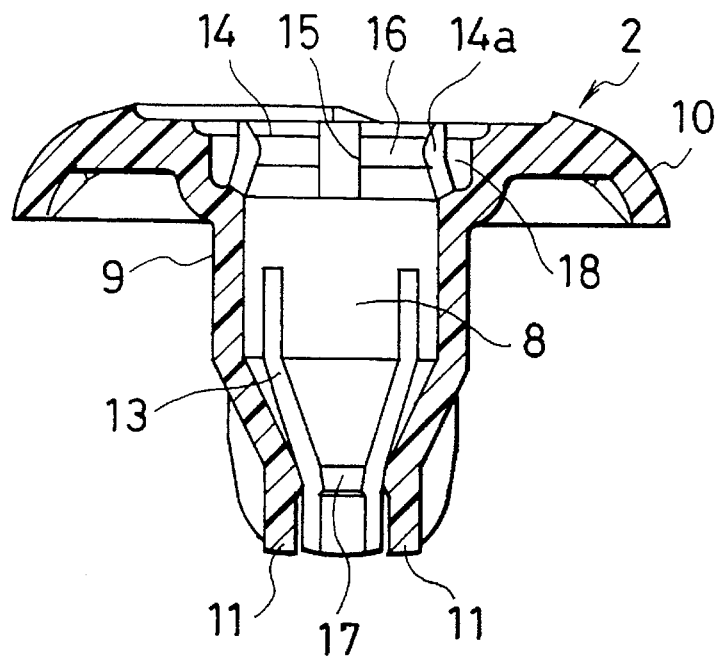
FIG. 5 is a cross-sectional view of the female member taken along line 5—5 of FIG. 3.

FIG. 2 shows the male and female members in the provisionally assembled state. Here the engagement of the portion 14 in the groove 5 at the end of the shaft causes the male member 1 to be provisionally maintained sticking up from the upper surface of the flange 10. With the engaging portion 14 located in the groove 5 the male member is maintained in its most extended state, projecting high above the flange 10.

Figure 6:
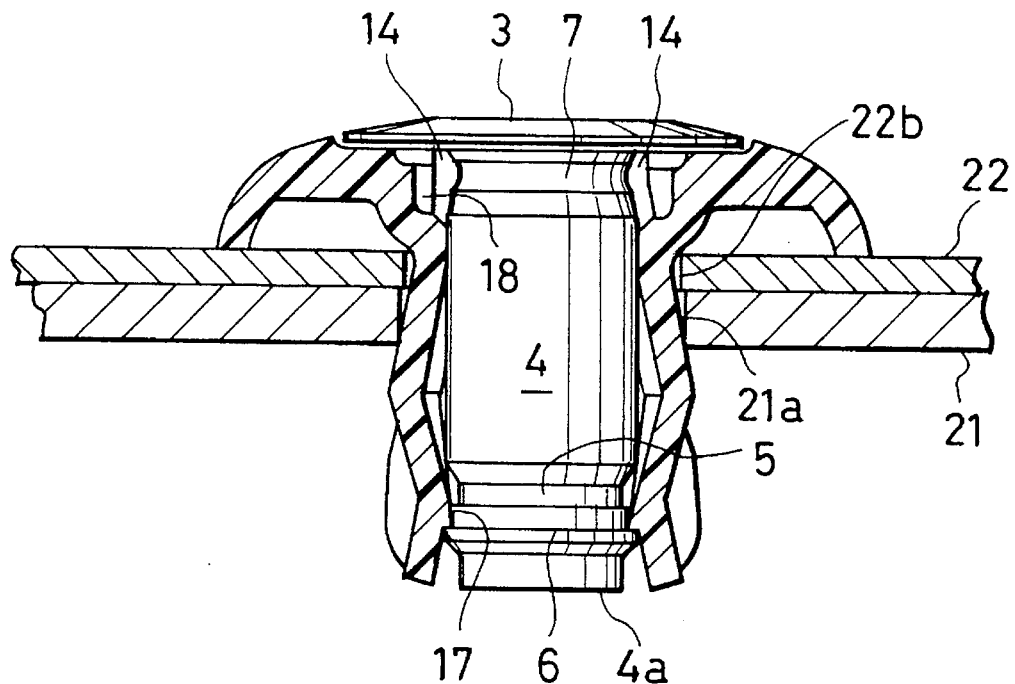
FIG. 6 is a cross-sectional front view illustrating the use of the clip of FIG. 1 to attach a part to a panel.
Figure 7:
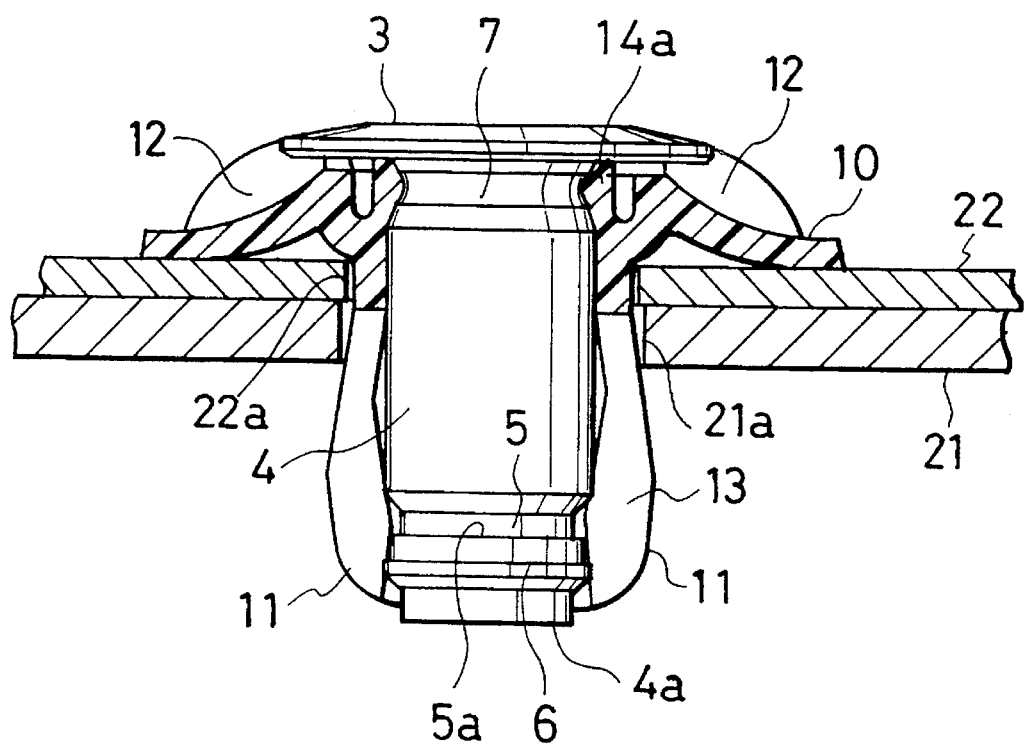
FIG. 7 is a cross-sectional view taken along line 5—5 of FIG. 3 showing the female member of the clip of FIG. 1 in use.

How the clip thus assembled is used will now be described, with reference to attaching the fixing plate 22 of a part to a panel 21 such as the panel of a car body, as shown in FIGS. 6 and 7. The body 9 of the female member is inserted legs first into preformed holes 21a and 22a until the legs protrude from the other side and the lower surface of the flange 10 abuts the upper surface of the fixing plate 22. The body 9 is inserted into the holes 21a and 22a by holding the male member 1. When the male member is stably in place with the flange 10 against the fixing plate 22, the male member is secured by using a finger to press the head 3. This pushing dislodges the engaging portion 14 from the groove 5, allowing the insertion of the shaft 4 into the hole 8. When the end of the shaft reaches the tapered section, it spreads the legs 11, utilizing the elasticity of the material. The spreading of the legs 11 on the lower side of the panel 21 affixes the part in place. Attachment is completed when the lower surface of the head 3 abuts against the upper surface of the flange 10, at which the point the engaging portion 14 snaps into the groove 7, whereby the male member 1 is held in the female member 2.

The hole 21a and hole 22a are given a diameter that just enables the insertion of the female member body 9 therethrough and ensures affixment when the legs 11 are spread. The clip can be unclipped by withdrawing the shaft 4. In this embodiment this can be readily accomplished by inserting the blade of a screwdriver or other suitable tool into the cutaway portions 12 of the flange 10, and levering up the head 3. Levering up the head 3 disengages the protrusion 6 of the shaft 4 from the small projecting portion 17 and the engaging portion 14 from the groove 7, allowing the male member 1 to be withdrawn. This also results in the contraction of the legs 11, thereby disengaging the legs 11 from the hole 21a and enabling the female member 2 to be withdrawn from the holes 21a and 22a without resistance.

When the male member 1 is being drawn out of the hole 8, the state of provisional engagement can be reestablished and maintained for re-use by the location of the engaging portion 14 in the groove 5 at the end of the shaft. The male and female members can of course be completely separated by pulling the male member 1 with enough force to overcome the resistance of the engaging portion of the female member.

It is to be understood that the invention is not limited to the example of the embodiment described above. For example, the engaging portion 14 provided at the upper end of the hole 8 may be in the form of a thin cylindrical collar. In the case of such an arrangement, it would be preferable to use slits 15 to divide the collar into a plurality of sections to facilitate the passage of the end of the shaft 4. Dividing the collar into plural sections would change the fixing force, so it goes without saying that the material would have to be of an appropriate thickness that ensures fastening strength and provides a tactile engagement snap.

It is preferable to provide the engaging portion 14 at the topmost portion of the opening at the upper end of the hole 8 and also that the groove 5 be provided close to the end of the shaft 4, as this will maximize the length of the male member shaft 4 extension during provisional assembly. A space 18 can be conveniently provided around the engaging portion 14 to ensure there is sufficient room for the engaging portion 14 to expand when the shaft 4 is inserted.

As described in the foregoing, the clip of the present invention is comprised by assembling separately formed male and female members by inserting the shaft of a male member into the hole of a female member. The male and female members can be provisionally assembled with the male member shaft fully extended by engagement of an engaging portion 14 provided at the topmost part of the female hole, and a groove provided at the end of the shaft. This ensures that there is a sufficient length of shaft to grip with the fingers to position the clip at a prescribed location for attaching plates together or for attaching parts to plates, thereby markedly increasing the efficiency of such operations.

When lack of space limits the length of the female member that can be used, the length of the male member shaft is also limited. As such, the arrangement of this invention is extremely advantageous in that in the provisionally assembled state it permits the male member shaft to be maintained fully extended, ensuring that it can be gripped. Moreover, as an elastic engaging portion is used to hold the male shaft, the male and female members can be disengaged as well as engaged, and the elasticity means that engagement takes place with a snap that provides tactile confirmation, which is useful when visual confirmation is not possible.

Obviously, numerous modifications and variations of the present invention are possible in light of the above teachings. It is therefore to be understood that within the scope of the appended claims, the invention may be practiced otherwise than as specifically described herein.

What is claimed is:

1. A clip comprising:
   a male member comprising a head portion, a shaft vertically descending from an underside of the head portion, and an engaging recess formed around a periphery of a lower end of the shaft; and
   a female member comprising a cylindrical body having a hole into which the male member is inserted, legs formed by dividing a lower end portion of the cylindrical body, a flange extending outward from a peripheral surface at an upper end portion of the cylindrical body, and an expanded engaging portion formed substantially entirely around an inner surface at an upper end of the hole in the cylindrical body, said engaging portion being located radially inward of the flange of the female member and engaging with the engaging recess of the male member at an inner peripheral surface of the flange of the female member as well as provisionally maintaining the male and female members in a provisionally assembled state.

2. A clip according to claim 1, wherein the expanded engaging portion comprises an annular protrusion formed around an inner surface at an upper end opening of the hole in the female member, and the engaging recess of the male member comprises an annular groove formed around the outer peripheral surface of the lower end of the shaft.

3. A clip according to claim 1, wherein the expanded engaging portion comprises a cylinder projecting up from the inner surface toward the opening of the hole in the female member, said cylinder being vertically slit into a plurality of sections.

4. A clip according to claim 1, wherein the legs of the female member taper down toward the lower end portion and are provided with a small projecting portion where the diameter is at its smallest.

5. A clip according to claim 1, wherein the shaft of the male member also has a protrusion around the lower end.

6. A clip according to claim 1, wherein said engaging portion is radially inwardly spaced from the flange, has slits formed therein and expands when the male member is inserted into the female member.

7. A clip comprising:
   a female member comprising a cylindrical body having a hole with an expanded engaging portion around an inner surface at an upper end of the hole, legs formed by dividing a lower end portion of the cylindrical body, small projecting portions formed on tapered reduced diameter portions at lower end portions of the cylindrical body, and a flange extending outward from a peripheral surface at an upper end portion of the cylindrical body; and
   a male member insertable in the female member and comprising a head portion, a shaft vertically descending from an underside of the head portion, an engaging recess formed around a periphery of a lower end of the shaft, said recess engaging with the expanded engaging portion of the female member and maintaining the male and female members in a provisionally assembled state, and an annular groove formed around the peripheral surface of an upper end portion of the shaft, said annular groove engaging with the expanded engaging portion of the female member when the engaging recess of the shaft engages with the small projecting portions of the female member.

* * * * *